US007298584B1

(12) United States Patent
Yamada et al.

(10) Patent No.: US 7,298,584 B1
(45) Date of Patent: Nov. 20, 2007

(54) DISK DRIVE WITH A COVER INCLUDING A FORMED-IN-PLACE GASKET WITH A CROSS-SECTIONAL CAVITY

(75) Inventors: Wayne M. Yamada, San Jose, CA (US); Norman Watkins, Gilroy, CA (US); Frederick J. Hanke, Newark, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 391 days.

(21) Appl. No.: 10/922,723

(22) Filed: Aug. 19, 2004

(51) Int. Cl.
*G11B 33/14* (2006.01)
(52) U.S. Cl. .................................................. 360/97.02
(58) Field of Classification Search ..................... None
See application file for complete search history.

(56) References Cited

U.S. PATENT DOCUMENTS

| | | | | |
|---|---|---|---|---|
| 5,187,621 A | * | 2/1993 | Tacklind .................. | 360/97.02 |
| 5,422,766 A | * | 6/1995 | Hack et al. ............... | 360/97.02 |
| 5,582,411 A | * | 12/1996 | Tyler .......................... | 277/650 |
| 6,392,838 B1 | * | 5/2002 | Hearn et al. ............. | 360/97.02 |
| 6,525,899 B2 | * | 2/2003 | Hearn et al. ............. | 360/97.02 |
| 6,556,372 B2 | * | 4/2003 | Hearn et al. ............. | 360/97.02 |
| 6,560,063 B1 | * | 5/2003 | Keffeler et al. .......... | 360/97.01 |
| 6,673,460 B2 | * | 1/2004 | Imai et al. .................. | 428/462 |
| 2002/0044376 A1 | * | 4/2002 | Serizawa et al. ........ | 360/97.02 |
| 2002/0127407 A1 | * | 9/2002 | Huang et al. ............... | 428/414 |
| 2003/0059554 A1 | * | 3/2003 | Paglia et al. ................ | 427/558 |
| 2004/0007828 A1 | * | 1/2004 | Forry et al. .................. | 277/592 |
| 2004/0075222 A1 | * | 4/2004 | Wegert et al. .............. | 277/629 |
| 2004/0241525 A1 | * | 12/2004 | Mekala et al. ................ | 429/36 |
| 2005/0099734 A1 | * | 5/2005 | Rafaelof .................. | 360/264.8 |

* cited by examiner

*Primary Examiner*—Allen Cao

(57) ABSTRACT

A disk drive includes a disk drive base and a cover engaged with the disk drive base. The disk drive further includes a formed-in-place gasket disposed between the disk drive base and the cover. The formed-in-place gasket is formed of a cured elastomer having a cross-sectional cavity for allowing the formed-in-place gasket to compress upon engagement of the cover and the disk drive base.

17 Claims, 3 Drawing Sheets

DISK DRIVE WITH A COVER INCLUDING A FORMED-IN-PLACE GASKET WITH A CROSS-SECTIONAL CAVITY

BACKGROUND OF THE INVENTION

1. Field of the Invention

The present invention relates generally to disk drives, and in particular to a disk drive with a cover including a formed-in-place gasket with a cross-sectional cavity.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider for reading and writing data from and to the disk.

The cover is engaged with the disk drive base with a plurality of screws. Adequate sealing of the cover and the disk drive base is critical in order to maintain a controlled internal environment of the disk drive. To facilitate sealing a gasket may be disposed between the cover and the disk drive base. A conventional gasket may take the form of a solid bead of an elastomer material disposed generally about a periphery of the cover. The material may be dispensed upon the cover in a liquid form that is subsequently cured. This results in the gasket having a solid generally circular cross section. The screws must be highly torqued so as to compress the gasket in order to achieve an adequate seal. There is a need in the art for an improved gasket configuration for use with a disk drive in comparison to the prior art.

SUMMARY OF THE INVENTION

According to an aspect of the present invention, there is provided a disk drive. The disk drive includes a disk drive base and a cover engaged with the disk drive base. The disk drive further includes a formed-in-place gasket disposed between the disk drive base and the cover. The formed-in-place gasket is formed of a cured elastomer having a cross-sectional cavity for allowing the formed-in-place gasket to compress upon engagement of the cover and the disk drive base.

According to various embodiments, the formed-in-place gasket may be formed upon the cover. The formed-in-place gasket may be formed of a UV cured material. The formed-in-place gasket may be formed of a urethane acrylate material or a silicon material for examples. The cross-sectional cavity may be a closed cavity. The cross sectional cavity may be an open cavity. The cross-sectional cavity may be generally C-shaped. The formed-in-place gasket may include a cover side and a base side with the cross-sectional cavity being disposed between the cover and base sides, and the cover side may be disposed adjacent the cover with the base side disposed adjacent the disk drive base.

According to another aspect of the present invention, there is provided a cover for use with a disk drive. The cover includes the formed-in-place gasket as described above.

DESCRIPTION OF THE PREFERRED EMBODIMENTS

Figure 1:
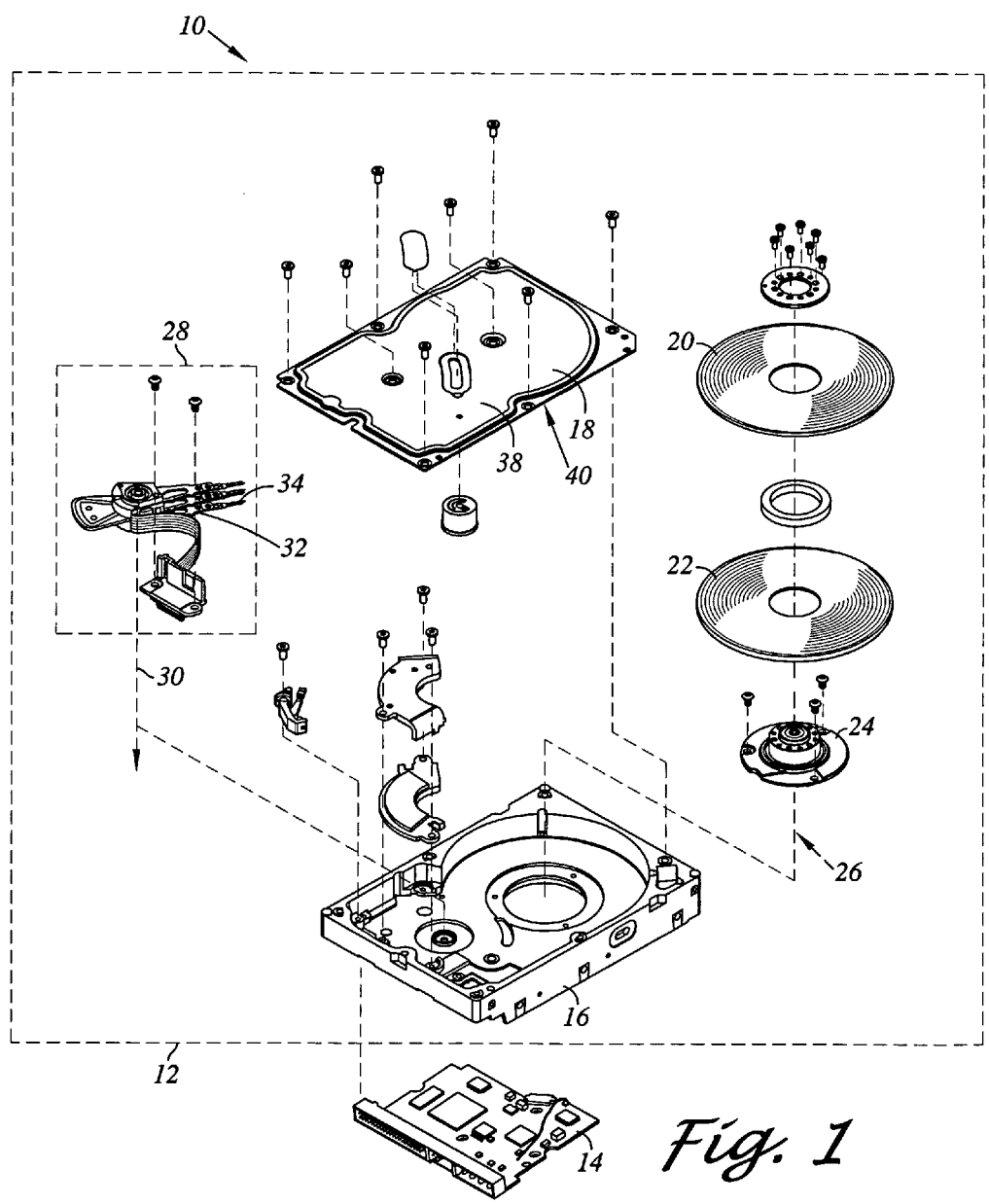
FIG. 1 is an exploded perspective view of a disk drive including a cover of an aspect of the present invention.

Referring now to the drawings wherein the showings are for purposes of illustrating preferred embodiments of the present invention only, and not for purposes of limiting the same, FIGS. 1-9 illustrate a disk drive including a formed-in-place gasket in accordance with aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22. Each magnetic disk 20, 22 contains a plurality of tracks for storing data.

The head disk assembly 12 further includes a spindle motor 24 for rotating the magnetic disks 20, 22 about an axis of rotation 26. The head disk assembly 12 further includes a head stack assembly 28 that rotates between limited positions about a pivot axis 30. The head stack assembly 28 includes a plurality of actuator arms, the lowermost one of which being denoted 32. A plurality of air bearing sliders, the lowermost one being denoted 34, are distally supported by the actuator arms 32 respectively adjacent the disks 20, 22. Each air bearing slider 34 includes a transducer head for reading and writing data from and to the disks 20, 22.

Figure 2:
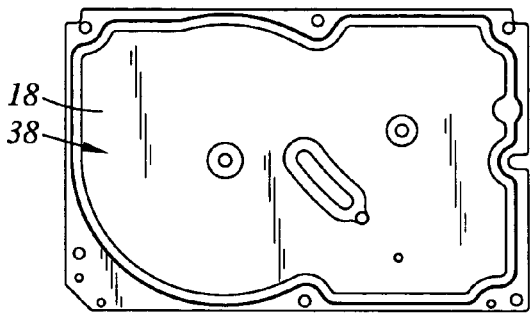
FIG. 2 is an enlarged top plan view of the cover of FIG. 1 of an aspect of the present invention.
Figure 3:
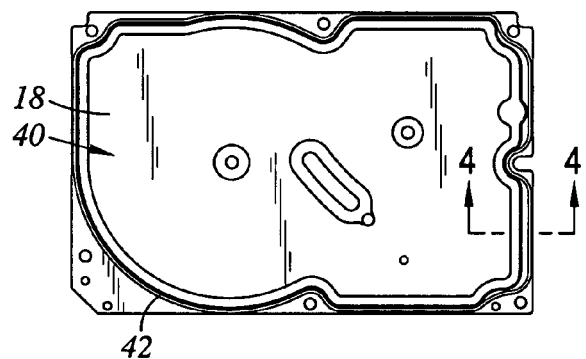
FIG. 3 is an enlarged bottom plan view of the cover of FIG. 1 including a formed-in-place gasket.
Figure 4:
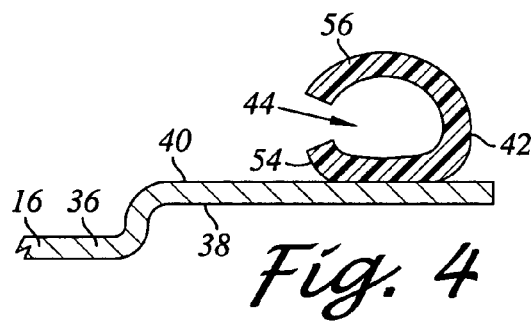
FIG. 4 is an enlarged cross sectional view of a portion of the cover and the formed-in-place gasket as seen along axis 4-4 of FIG. 3.

According to an aspect of the present invention, there is provided the disk drive 10. The disk drive 10 includes the disk drive base 16 and the cover 18 engaged with the disk drive base 16. The cover 18 includes a cover main body 36 with top and bottom sides 38, 40. Referring additionally to FIGS. 2 and 3 there are respectively depicted enlarged top and bottom plan views of the cover 18 of FIG. 1. The disk drive 10 further includes a formed-in-place gasket 42 disposed between the disk drive base 16 and the cover 18. The formed-in-place gasket 42 is formed of a cured elastomer having a cross-sectional cavity 44 for allowing the formed-in-place gasket 42 to compress upon engagement of the cover 18 and the disk drive base 16. FIG. 4 is an enlarged cross-sectional view of a portion of the cover 18 and the formed-in-place gasket 42 as seen along axis 4-4 of FIG. 3.

Figure 5:
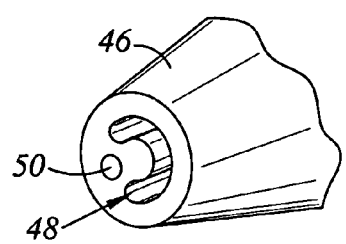
FIG. 5 is an enlarged perspective view of a nozzle tip.
Figure 6:
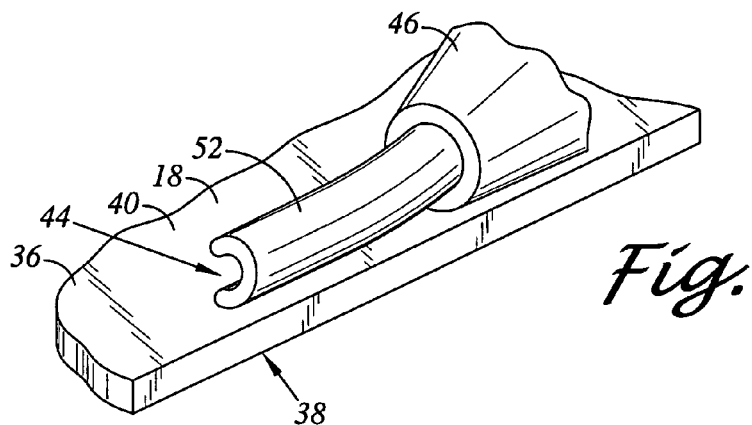
FIG. 6 is an enlarged perspective view of the nozzle tip of the FIG. 5 depicted dispensing an elastomer upon a portion of the cover.

As an example of a method for forming the formed-in-place gasket 42, there is depicted an enlarged perspective view of a nozzle tip 46 as seen in FIG. 5. The nozzle tip 46 includes a dispensing port 48 and a UV light source 50. FIG.

6 is an enlarged perspective view of the nozzle tip 46 of FIG. 5. The nozzle tip 46 is depicted dispensing an elastomer 52 from the dispensing port 48 upon a portion of the bottom side 40 of the cover 18. The formed-in-place gasket 42 may be formed of a UV cured material. In this regard, upon being dispensed from the nozzle tip 46, the UV light source 50 may be used to selectively cure the exposed portion of the elastomer 52 to form the cross-sectional cavity 44. This allows the elastomer 52 to have integrity of shape to maintain the cross-sectional cavity 44 while also being in a liquid or semi-liquid form facilitating placement and adhesion to the cover 18. Subsequently, the dispensed elastomer 52 may be entirely cured to complete the forming of the formed-in-place gasket 42.

As such, the term formed-in-place refers to the formed-in-place gasket 42 being formed at a location in relation to the cover 18 and/or the disk drive base 16 where the formed-in-place gasket 42 is intended to be disposed during installation. As the formed-in-place gasket 42 is to be disposed between the disk drive base 16 and the cover 18, being disposed upon either the disk drive base 16 or the cover 18 would be appropriate. In the example shown, the formed-in-place gasket 42 is formed upon the cover 18. This would be in contrast to being separately formed such as a molded piece of material that is first formed and then attached. In this regard, the formed-in-place manufacturing technique is considered to be relatively more economically efficient.

The formed-in-place gasket 42 may be formed of a urethane acrylate material or a silicon material for examples. Additionally, other materials and techniques used to form the formed-in-place gasket 42 may be chosen from those which are well known to one of ordinary skill in the art.

Figure 7:
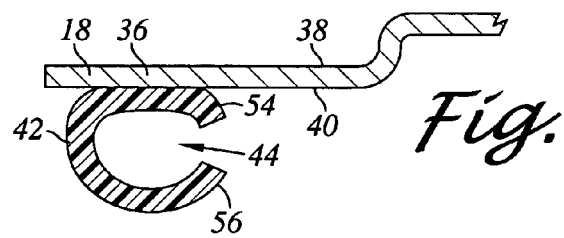
FIG. 7 is the enlarged cross-sectional view of the portion of the cover and the formed-in-place gasket of FIG. 4 shown in a flipped configuration.
Figure 8:
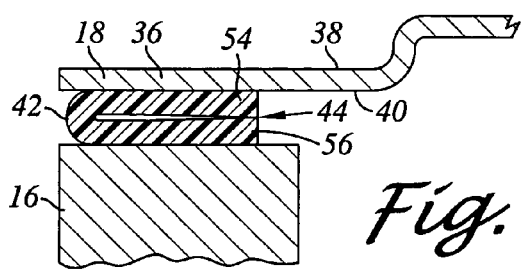
FIG. 8 is an enlarged cross-sectional view of the portion of the cover and the formed-in-place gasket of FIG. 7 as shown in relation to a portion of the disk drive base.

Referring now to FIG. 7 there is depicted the enlarged cross-sectional view of the portion of the cover 18 and the formed-in-place gasket 42 of FIG. 4 shown in a flipped configuration. FIG. 8 is an enlarged cross-sectional view of the portion of the cover 18 and the formed-in-place gasket 42 of FIG. 7 as shown in relation to a portion of the disk drive base 16 with the cover 18 installed. As is shown, the formed-in-place gasket 42 is compressed. In this regard, such compression is in a direction between the cover 18 and the disk drive base 16 for sealing the interface therebetween. It is contemplated that fasteners, such as screws, may be used to engage the cover 18 to the disk drive base 16. Thus, a torquing of the screws would compress the formed-in-place gasket 42 with the cross-sectional cavity 44 collapsing or at least partially collapsing upon itself.

The cross-sectional cavity 44 may be an open cavity. As depicted, the cross-sectional cavity 44 may be generally C-shaped. In this regard, a C-shape is observed when a cross-sectional cut is made lateral to the formed-in-place gasket 42 and viewed longitudinally along the formed-in-place gasket 42. The formed-in-place gasket 42 may include a cover side 54 and a base side 56 with the cross-sectional cavity 44 being disposed between the cover and base sides 54, 56, and the cover side 54 may be disposed adjacent the cover 18 with the base side 56 disposed adjacent the disk drive base 16. In the embodiment shown, the cross-sectional cavity 44 is shown as being exposed to an interior of the disk drive 10. It is contemplated that other orientations may be utilized as well.

Figure 9:
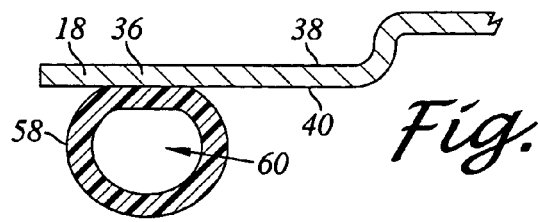
FIG. 9 is a view similar to that of FIG. 8, however, with a formed-in-place gasket according to another embodiment with a closed cross-section.

FIG. 9 is a view similar to that of FIG. 8, however, with a formed-in-place gasket 58 according to another embodiment with a closed cross-section. In this embodiment, the formed-in-place gasket 58 includes a cross-sectional cavity 60 that is a closed cavity.

According to another aspect of the present invention, there is provided the cover 18 for use with the disk drive 10. The cover 18 includes a formed-in-place gasket, such as 42 or 58 as described above.

We claim:

1. A disk drive comprising:
   a disk drive base;
   a cover engaged with the disk drive base; and
   a formed-in-place gasket disposed between the disk drive base and the cover, the formed-in-place gasket comprising a UV cured elastomer having a cross-sectional cavity.

2. The disk drive of claim 1 wherein the formed-in-place gasket is adhered to the cover but not adhered to the disk drive base.

3. The disk drive of claim 2 wherein the cover does not include any groove for receiving the formed-in-place gasket.

4. The disk drive of claim 1 wherein the formed-in-place gasket is formed of a urethane acrylate material.

5. The disk drive of claim 1 wherein the formed-in-place gasket is formed of a silicon material.

6. The disk drive of claim 1 wherein the cross-sectional cavity is a closed cavity.

7. The disk drive of claim 1 wherein the cross-sectional cavity is an open cavity.

8. The disk drive of claim 7 wherein the cross-sectional cavity is generally C-shaped.

9. The disk drive of claim 7 wherein the formed-in-place gasket includes a cover side and a base side with the cross-sectional cavity being disposed between the cover and base sides, the cover side being disposed adjacent the cover, the base side being disposed adjacent the disk drive base.

10. A cover for use with a disk drive base, the cover comprising:
    a cover main body; and
    a formed-in-place gasket adhered to the cover main body, the formed-in-place gasket comprising a UV cured elastomer having a cross-sectional cavity.

11. The cover of claim 10 wherein the cover main body does not include any groove for receiving the formed-in-place gasket.

12. The cover of claim 10 wherein the formed-in-place gasket is formed of a urethane acrylate material.

13. The cover of claim 10 wherein the formed-in-place gasket is formed of a silicon material.

14. The cover of claim 10 wherein the cross-sectional cavity is a closed cavity.

15. The cover of claim 10 wherein the cross-sectional cavity is an open cavity.

16. The cover of claim 15 wherein the cross-sectional cavity is generally C-shaped.

17. The cover of claim 15 wherein the formed-in-place gasket includes a cover side and an opposing base side with the cross-sectional cavity being disposed between the cover and base sides, the cover side being disposed adjacent the cover main body.

* * * * *